Figure 2:
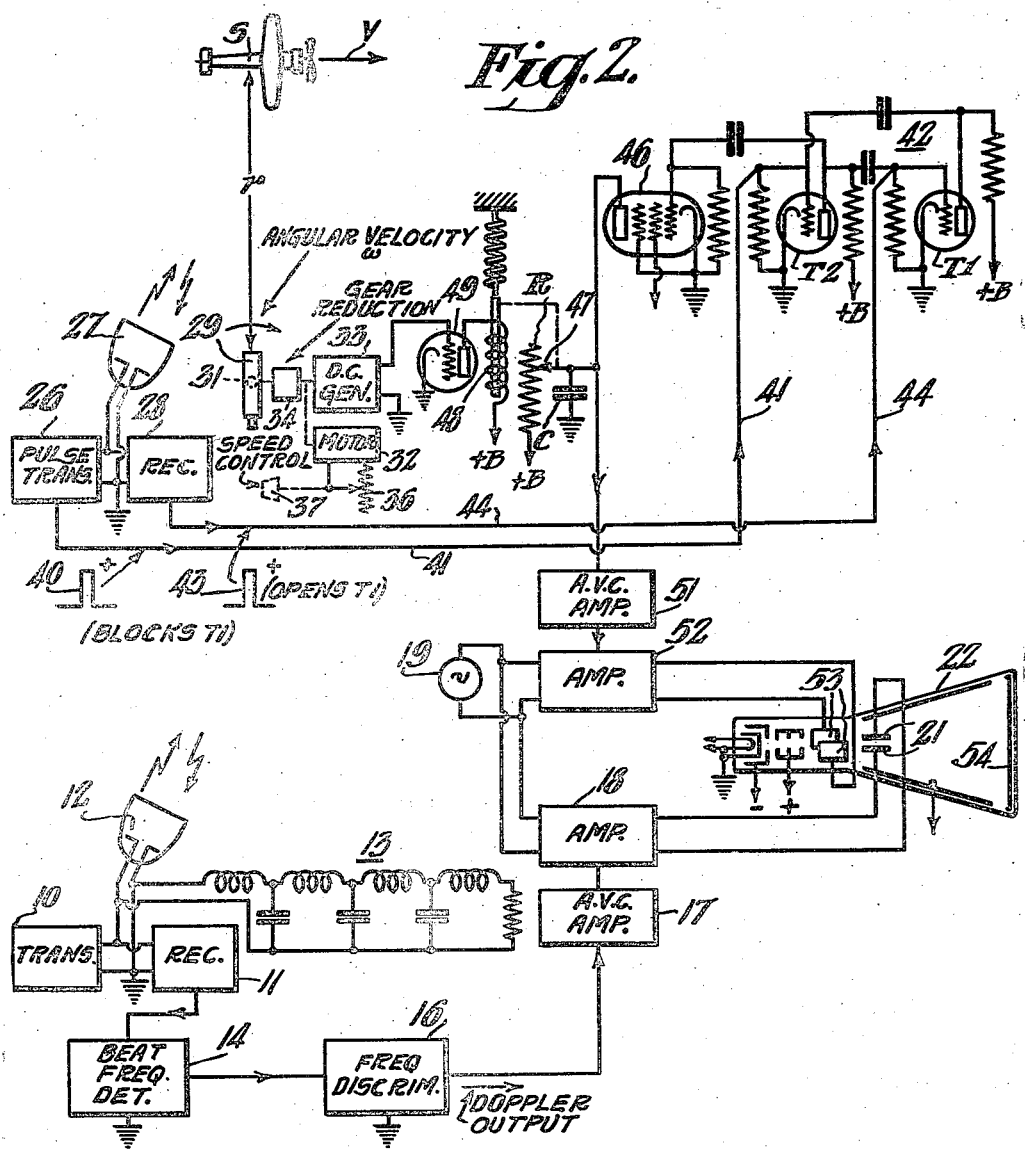

Oct. 8, 1946.     T. T. EATON     2,408,742
RADIO SYSTEM FOR VELOCITY MEASUREMENT
Filed Dec. 11, 1942     2 Sheets-Sheet 1
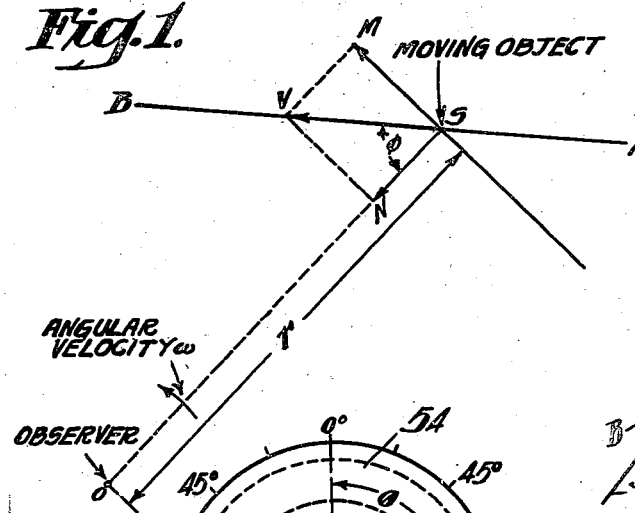
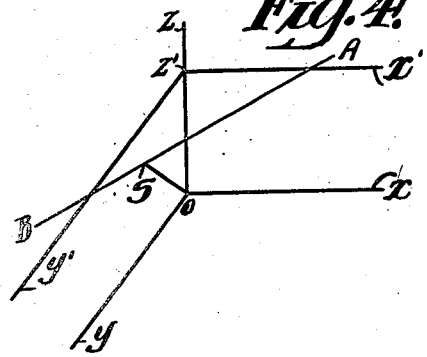
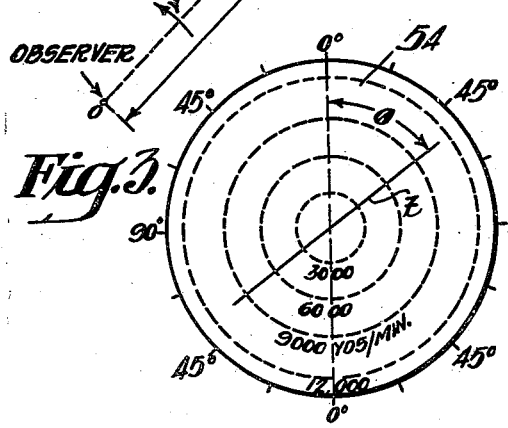
DEGREE READING GIVES ANGLE φ BETWEEN LINE OF SIGHT TO MOVING OBJECT AND THE LINE OR DIRECTION OF TRAVEL OF OBJECT.
LENGTH OF TRACE $z$ GIVES SPEED OF OBJECT.
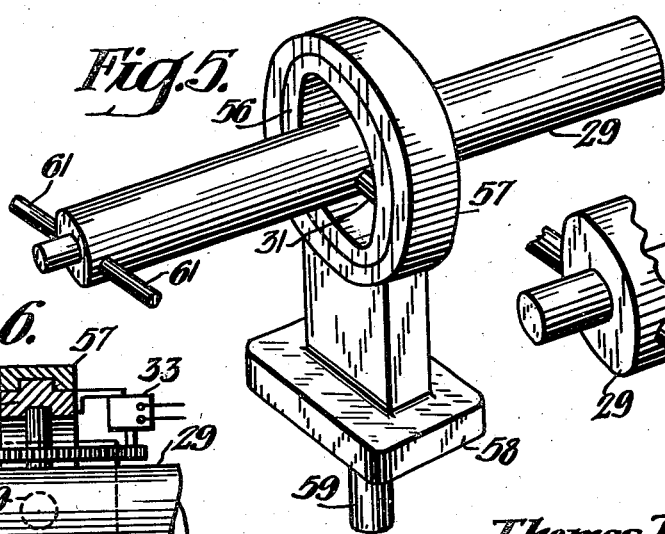
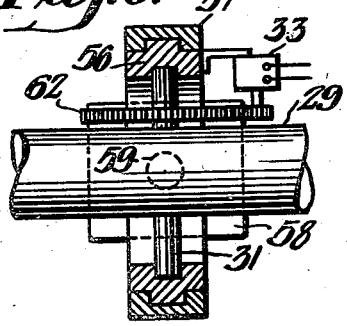
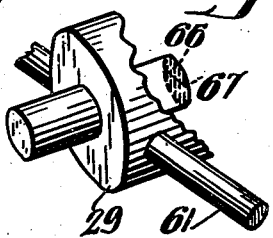
Inventor
Thomas T. Eaton
By
Attorney Patented Oct. 8, 1946

2,408,742

UNITED STATES PATENT OFFICE 2,408,742

RADIO SYSTEM FOR VELOCITY MEASUREMENT

Thomas T. Eaton, Haddon Heights, N. J., assignor to Radio Corporation of America, a corporation of Delaware Application December 11, 1942, Serial No. 468,868

5 Claims. (Cl. 250—1)

My invention relates to the measurement of the total velocity of moving objects and particularly to a system and method which utilizes the reflection of radio waves from the moving object for obtaining the said velocity.

It is known that the speed with which an object, such as an airplane, approaches an observer can be determined by radiating a radio wave toward the object, receiving the reflected wave, and then determining the frequency difference of the two waves caused by the Doppler effect. This speed of approach can also be determined in other ways as by means of known pulse-echo systems which give the rate of change of range or distance between the observer and the moving object. These methods, however, give only one component of the total velocity.

An object of the present invention is to provide an improved method of and means for obtaining the total velocity of a moving object. It will be understood that the term velocity is used to include the actual speed of the object and its direction of motion. A further object of the invention is to provide an improved method of and means for determining the total velocity of an aircraft regardless of the direction of its line of flight and position with respect to the observer.

In a preferred embodiment of the invention the total velocity of an object is found by determining (1) the velocity component toward the observer and (2) the velocity component at right angles to the line of sight from the observer to the object. The first of these components may be found by above described methods. The second of these components may be found, for example, by keeping a radio beam or telescope sighted on the moving object whereby the telescope is turned at a certain angular velocity, by finding the distance to the moving object, and by then obtaining the product of said angular velocity and said distance. The second velocity component is equal to or proportional to this product. Voltages representative of the two velocity components may now be applied to a suitable indicator device. For example, the first and second components may be applied to circuits controlling the vertical and horizontal deflection, respectively, of a cathode ray tube whereby the length of the resulting cathode ray trace gives the speed of the object and the angle of the trace with respect to the vertical is the angle between the line of motion of the object and the line of sight from the observer to the object.

The invention will be better understood from the following description taken in connection with the accompanying drawings in which Figure 1 is a vector diagram that is referred to in explaining the invention, Figure 2 is a circuit diagram of one embodiment of the invention, Figure 3 is a view of the end of the cathode ray indicator tube shown in Fig. 2, Figure 4 is a diagram that is referred to in explaining the invention as applied to the measurement of the total velocity of aircraft or the like, Figure 5 is a view in perspective of a telescope which is mounted for use in obtaining the total velocity of aircraft or the like, Figure 6 is a view in cross-section of a portion of the telescope mount shown in Fig. 5, and Figure 7 is a view showing the cross-hairs of the telescope of Fig. 5.

In the several figures, like parts are indicated by similar reference characters.

In Fig. 1, an observer is indicated at O and a moving object is indicated at S, the object moving along the line AB with a velocity SV. The velocity SV has the two components SN and SM which are, respectively, in the direction of the line of sight OS and at right angles thereto. The object S is located at a distance $r$ from the observer. It is assumed that the line of motion AB of the object S and the line of sight OS are in the plane of the paper.

Fig. 2 illustrates apparatus for determining the velocity components SN and SM whereby the total velocity SV may be determined. Apparatus comprising a radio pulse transmitter 10, a receiver 11, an antenna 12 and a delay line 13 may be utilized for measuring the component SN by the Doppler effect. The delay line 13 has a reflecting termination whereby a transmitted pulse may travel down the line 13 and back so that the delayed pulse is present at the receiver 11 to provide a reference frequency for the pulse that has been reflected back to the receiver 11 by the moving object S. The reference frequency pulse and the pulse reflected from the object S are supplied to a beat frequency detector 14 to obtain a beat frequency that is supplied to a frequency discriminator 16.

The output voltage of the discriminator 16 is proportional to the beat frequency and, therefore, to the velocity component SN of the object S. This output voltage is applied to an A. V. C. or gain control amplifier 17 for controlling the gain of an amplifier 18 through which a sine wave deflecting voltage from a source 19 is supplied to the vertical deflecting plates 21 of a cathode ray indicator tube 22.

The above described pulse-echo system with a delay line for utilizing the Doppler effect is described and claimed in application Serial No. 287,172, filed July 28, 1939, in the name of William D. Hershberger, entitled "Radio pulse-echo system using Doppler effect." Various other systems for measuring the Doppler effect are known in the art.

The velocity component SM may be obtained, for example, by means of a radio pulse transmitter 26, an antenna 27 and a pulse-echo receiver 28 for determining the distance component $r$ (distance to the objects S) and by means of a telescope 29 which may be rotated in the plane OSB (Fig. 1) for determining the angular velocity component $\omega$. This rotation of the telescope is about an axis 31 that is perpendicular to the optical or line of sight axis of the telescope. The pulse-echo apparatus 26—27—28 may be similar to that described in application Serial No. 184,354, filed January 11, 1938, in the name of Irving Wolff and William D. Hershberger and entitled "Signaling system." It may simplify a consideration of the operation to assume that the line of motion of the object S and the line of sight from observer to the object S are in the horizontal plane, in which case the telescope 29 pivots about a vertical axis 31.

A voltage that is proportional to the angular velocity $\omega$ may be obtained in various ways. In the example illustrated, a motor 32 drives a direct-current generator 33 and also drives the telescope 29 through reduction gears 34 to turn it about its axis 31. The motor 32 is provided with suitable means such as a variable resistor 36 and a speed control knob 37 for controlling its speed. Thus an observer may keep the telescope crosshairs on the object S by operating the speed control knob, and the voltage of the D.-C. generator output will be directly proportional to the angular velocity $\omega$.

It will be evident that the velocity component SM is equal to $\omega r$ since this component is tangential to the imaginary circle traced by the outer end of radius $r$ as the telescope is turned. One way of obtaining the product $\omega r$ is to charge a capacitor C linearly through a resistor R for a length of time determined by the interval between the transmission of a pulse and its reception after reflection from object S, i. e., for a length of time determined by the distance $r$, and to make the rate at which the capacitor C is charged proportional to the angular velocity $\omega$. Then the average or peak voltage E across capacitor C will be proportional to the desired velocity component SM.

To control the length of time capacitor C is charged, a portion of the energy of each transmitted pulse is supplied as a pulse 40 of positive polarity over a conductor 41 to the grid of a vacuum tube T2, this being one tube of a multivibrator 42 comprising a pair of vacuum tubes T1 and T2. The received pulses 43 which have been reflected from the moving object S are supplied with positive polarity over a conductor 44 to the grid of tube T1.

The anode of tube T2 is coupled to the control grid of a vacuum tube 46 which has its anode-cathode impedance connected across the capacitor C. Anode voltage is applied to the tube 46 through the resistor R. The capacitor C is charged through resistor R starting with the occurrence of transmitted pulse 40 and ending with the occurrence of the received pulse 43, the action being as follows: Pulse 40 causes tube T1 to block and causes T2 to unblock, thus applying a negative pulse to the grid of tube 46 to drive it to plate current cut-off. This condition holds for a period lasting until the pulse 43 occurs. To assure the holdover, it is preferable to use the sensitivity control of the type disclosed in application Serial No. 267,475, filed April 12, 1939, in the name of Rogers M. Smith. Without the sensitivity control, the pulse 40 might pass on through the receiver 28 to trigger the multivibrator 42. During this period, current from the B-supply cannot flow through the tube 46 but, instead, flows into the capacitor C to charge it. The occurrence of reflected pulse 43 unblocks the tube T1 and blocks the tube T2 whereby a positive pulse is applied to the grid of tube 46 to unblock it and to permit discharge of capacitor C therethrough. Because of the high resistance of resistor R as compared with the tube impedance through which capacitor C discharges, the capacitor C is discharged substantially to ground potential before the next transmitted pulse 40 occurs. It is apparent that the greater the interval between pulses 40 and 43, the greater the charge received by capacitor C, and the greater the voltage E across it. The wave shape of the voltage E is that of a straight sawtooth.

It is also evident that the rate at which capacitor C is charged may be changed by varying a tap 47 on the resistor R. The tap 47 is mechanically coupled to a solenoid 48 which is actuated by the anode current of a vacuum tube 49 in accordance with the output voltage of the generator 33. Thus, when the telescope 29 is moved at a certain angular velocity, there is a corresponding voltage applied to the grid of tube 49 and the solenoid 48 pulls the tap 47 to a certain position on resistor R. The greater the angular velocity $\omega$, the lower the resistance in the charging circuit of capacitor C and the faster it is charged.

It will be understood from the foregoing that the voltage E across capacitor C increases with any increase in either the distance $r$ or the angular velocity $\omega$. It may not be apparent, however, that this voltage E is proportional to the product $r\omega$ and, therefore, to the velocity vector SM. The reason for the relation $E=Kr\omega$ (where K is a constant) is that the capacity of capacitor C is large enough so that it is never charged beyond a small percentage of full charge whereby the curve of voltage E plotted against time is substantially linear. Within this linear region of the curve the value of voltage E reached in a given unit of time is substantially proportional to the amount of resistance R in the charging circuit. Therefore, the voltage E is directly proportional to the product $r\omega$ and to the velocity vector SM.

The voltage E is applied to an amplifier 51 which controls the gain of an amplifier 52 through which the sine wave deflection voltage from the generator 19 is supplied to the horizontal deflecting plates 53 of the indicator tube 22.

The tube 22 may be a cathode ray tube of conventional construction having a fluorescent screen 54 on which a linear trace $t$ will appear as shown in Fig. 3. The length of the trace $t$ gives the speed of object S or the magnitude of the velocity vector SV while the angle $\phi$ that the trace $t$ makes with the vertical is the angle $\phi$ of Fig. 1, i. e., the angle between the line of motion of the object S and the line of sight from the observer to the object. Thus the speed reading and the angle reading give the total velocity or velocity vector SV.

If the moving object S is an airplane, for example, the plane OSB defined by its line of motion AB and by the line of sight OS will not be a horizontal plane but, instead, may have a position such as that indicated in Fig. 4 where the airplane S is moving in the direction AB in the plane $x'$, $z'$, $y'$ at a constant altitude. The total velocity of the aircraft may be determined as previously described if the telescope is properly mounted so that it may be positioned with the telescope axis 31 perpendicular to the plane OSB. In Figs. 5 and 6 a suitable telescope mounting is illustrated. The shaft or axis 31 is rotatably mounted in a ring 56 which, in turn, is rotatably mounted in a supporting ring 57 set on a pedestal 58. The pedestal 58 is rotatable about a vertical axis 59. By taking hold of the handles 61 an observer may move the telescope into the position where the axis 31 is perpendicular to the plane OSB. He then keeps the telescope sighted on object S by rotating the telescope about the axis 31 at the required angular velocity. A voltage proportional to this angular velocity may be obtained in various ways. For example, as shown in Fig. 6, a gear wheel 62 splined to the shaft 31 may rotate the armature of the D.-C. generator 33 which is mounted on the ring 56. It will be understood that in this design the motor 32 (Fig. 2) is omitted.

In order to assist an observer in positioning properly a telescope which is mounted as shown in Fig. 5, it may be desirable to provide a plurality of parallel cross-hairs 66 which are perpendicular to the axis 31 and a cross-hair 67 that is perpendicular to the cross-hairs 66. Then the telescope may be sighted on an airplane and swung into a position where the airplane is moving parallel to cross-hairs 66. Then the telescope is moved about the axis 31 at the angular velocity required to keep the airplane stationary with respect to the cross-hairs 66 and 67. Thus the desired angular velocity information is supplied by the generator 34 for use in the manner previously described.

It should be understood that the invention is not limited to the use of the specific apparatus that has been described for purpose of illustration. For instance, the apparatus for determining the angular velocity $\omega$ may comprise a pulse-echo system wherein pulses are radiated from an antenna assembly having four overlapping radiation patterns and provided with lobe switching. Such an antenna assembly may be mechanically coupled to the generator 33 and turned to keep its "line of sight axis" pointed on aircraft just as described in connection with the embodiment utilizing a telescope. If desired, the said antenna assembly may replace the antenna 27 whereby any necessity for duplicating transmitter and receiver equipment is avoided. It may also be noted that the product $\omega r$ may be obtained in various ways. For example, a modulation circuit may be employed wherein the voltage $\omega$ is modulated by the voltage $r$; the result of such modulation is a voltage proportional to $\omega r$.

I claim as my invention:

1. In combination in a system for determining that component of an object's velocity which is at right angles to the line of sight from the observer to the object, an object locating means which has a line of sight axis and which is rotatably mounted about an axis perpendicular to said line of sight axis, means for producing an electrical quantity that is representative of the distance from the observer to the object, means for positioning said object locating means with its mounting axis perpendicular to the plane defined by the line of motion of said object and by the line of sight from the observer to the object whereby the object locating means may be turned in said plane about said mounting axis at such an angular velocity as to keep said line of sight axis pointed toward said object, means responsive to said turning of the object locating means for obtaining an electrical quantity that is representative of said angular velocity, and means for multiplying said two electrical quantities to obtain a product which is equal to said desired velocity component.

2. In combination in a system for determining that component of an object's velocity which is at right angles to the line of sight from the observer to the object, an object locating means which has a line of sight axis and which is rotatably mounted about an axis perpendicular to said line of sight axis, means for determining the distance from the observer to the object, means for positioning said object locating means with its mounting axis perpendicular to the plane defined by the line of motion of said object and by the line of sight from the observer to the object whereby the object locating means may be turned in said plane about said mounting axis at such an angular velocity as to keep said line of sight axis pointed toward said object, and means electrically connected to said distance determining means and to said object locating means for multiplying said distance by said angular velocity to obtain a product which is equal to said desired velocity component, said last means comprising a capacitor, means for charging said capacitor at a linear rate for a length of time that is proportional to said distance, and means for making the rate at which said capacitor is charged proportional to said angular velocity whereby the voltage across said capacitor at the end of each charging period is proportional to said product.

3. In combination in a system for determining the total velocity of an object, a telescope which is mounted for rotation about an axis perpendicular to the longitudinal or optical axis of the telescope, means for positioning said telescope with its mounting axis perpendicular to the plane defined by the line of motion of said object and by the line of sight from the observer to the object whereby the telescope may be turned in said plane about said mounting axis at such an angular velocity while sighting on said object that said object is kept substantially stationary in the field of view of the telescope, means responsive to said turning of the telescope for obtaining an electrical quantity that is representative of said angular velocity, means for determining the distance from the observer to the object, means electrically connected to said last two means for multiplying said distance by said angular velocity to obtain a product which is equal to the total velocity component which is at right angles to said line of sight, and means for obtaining the total velocity component which is in the direction of said line of sight whereby said total velocity may be found from said two components.

4. In combination in a system for determining the total velocity of an object, a sighting means which is mounted for rotation about an axis perpendicular to its line of sight axis, means for positioning said sighting means with its mounting axis perpendicular to the plane defined by the line of motion of said object and by the line of sight from the observer to the object whereby the sighting means may be turned in said plane about said mounting axis at such an angular velocity as to keep the line of sight axis pointed at said object, means responsive to said turning of the sighting means for obtaining an electrical quantity that is representative of said angular velocity, means for determining the distance from the observer to the object, means electrically connected to said last two means for multiplying said distance by said angular velocity to obtain a product which is equal to the total velocity component which is at right angles to said line of sight, and means for obtaining the total velocity component which is in the direction of said line of sight, a cathode ray tube having a screen upon which a cathode ray trace may be produced, means for deflecting the cathode ray in one direction with the amplitude of deflection proportional to one of said velocity components, and means for deflecting the cathode ray substantially at right angles to the direction of the other deflection and with the amplitude of deflection proportional to the other velocity component whereby the total speed of the object is indicated by the length of the resulting trace on said screen and whereby the direction of motion of said object with respect to said line of sight is given by the angle which said trace makes with one of said directions of deflection.

5. In combination in a system for determining the total velocity of an object, a telescope which is mounted for rotation about an axis perpendicular to the longitudinal or optical axis of the telescope, means for positioning said telescope with its mounting axis perpendicular to the plane defined by the line of motion of said object and by the line of sight from the observer to the object whereby the telescope may be turned in said plane about said mounting axis at such an angular velocity while sighting on said object that said object is kept substantially stationary in the field of view of the telescope, means responsive to said turning of the telescope for obtaining an electrical quantity that is representative of said angular velocity, means for determining the distance from the observer to the object, means electrically connected to said last two means for multiplying said distance by said angular velocity to obtain a product which is equal to the total velocity component which is at right angles to said line of sight, and means for obtaining the total velocity component which is in the direction of said line of sight, a cathode ray tube having a screen upon which a cathode ray trace may be produced, means for deflecting the cathode ray in one direction with the amplitude of deflection proportional to one of said velocity components, and means for deflecting the cathode ray substantially at right angles to the direction of the other deflection and with the amplitude of deflection proportional to the other velocity component whereby the total speed of the object is indicated by the length of the resulting trace on said screen whereby the direction of motion of said object with respect to said line of sight is given by the angle which said trace makes with one of said directions of deflection.

THOMAS T. EATON.